Sept. 25, 1956  H. A. VAN DUSEN, JR  2,764,670
AIRFIELD LIGHT PROJECTOR
Filed Aug. 24, 1953
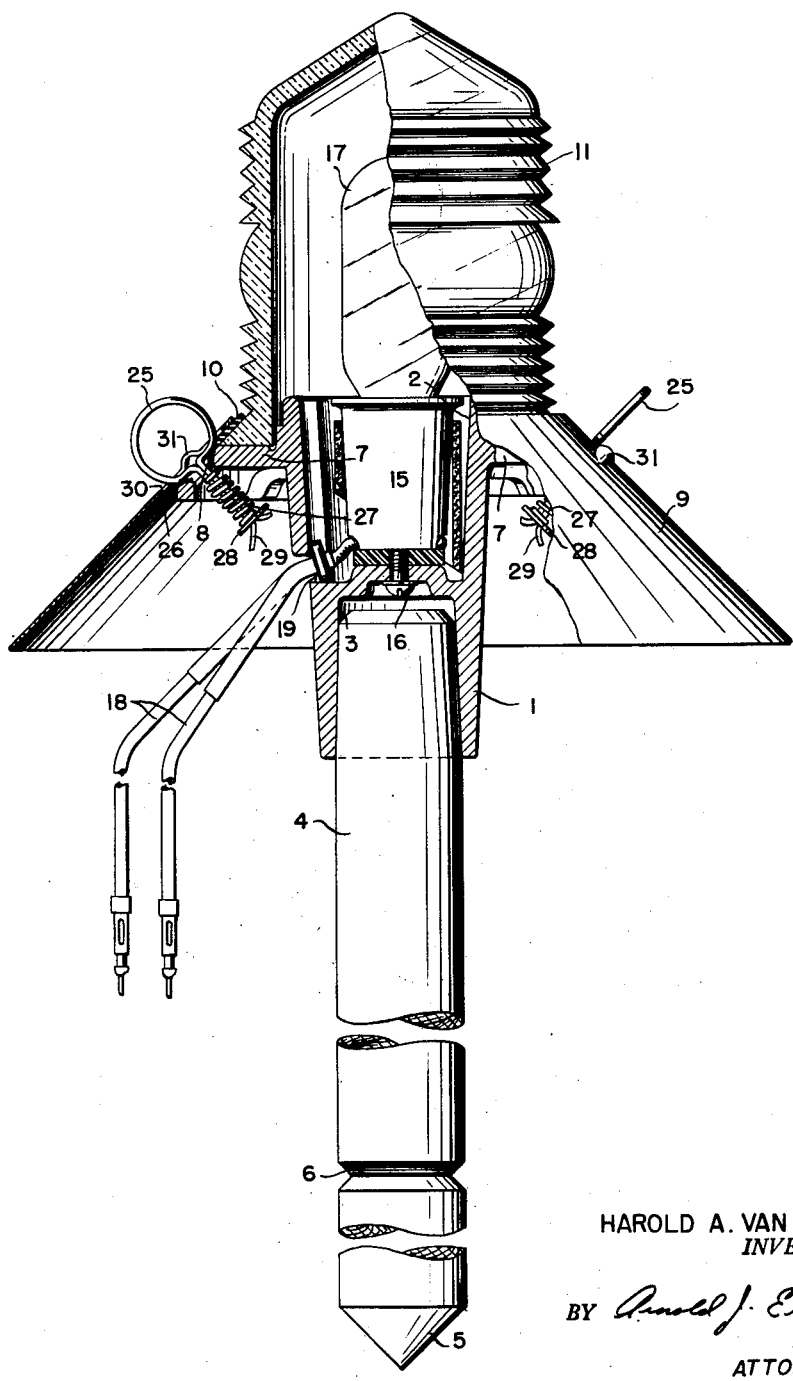
HAROLD A. VAN DUSEN JR.
*INVENTOR.*
BY *Arnold J. Ericsen*
ATTORNEY 2,764,670
Patented Sept. 25, 1956

2,764,670

AIRFIELD LIGHT PROJECTOR

Harold A. Van Dusen, Jr., South Milwaukee, Wis., assignor to McGraw Electric Company, Milwaukee, Wis., a corporation of Delaware Application August 24, 1953, Serial No. 376,037

6 Claims. (Cl. 240—1.2)

This invention relates to a lighting fixture, and more particularly to a light projector intended for use as a signalling or marker light on an airfield.

In recent years the many advantages of private flying have become apparent to persons located in remote areas, and for persons in specialized occupations wherein the pilot-owners of small aircraft travel far in a relatively short period of time in order to operate their businesses economically. It will be apparent that these persons may include farmers, building contractors, oil prospectors and operators, crop dusters and others who find it beneficial to operate private planes. People in occupations of this nature generally have access to considerable portions of land, which may be conveniently leveled off into a private air landing strip, whereby the private plane may be kept near at hand without requiring a shuttle service between the landing strip and the place of destination.

It is obviously very important to persons operating private landing strips to have these strips lighted or otherwise marked for takeoff and landing operations at night or during inclement weather. In order to provide necessary safe operating conditions offered by runway marker lights, it is important to keep the cost of this lighting at a minimum. In addition, it is often essential that these lights be made portable in order that they may be moved from one temporary operating location to another. It is also an advantage to provide an air strip lighting installation, which may be electrically connected to a conventional house current service line, or operated from conventional storage battery circuits.

It is therefore, among the objects of this invention to provide a portable light projector which will provide the above-mentioned advantages of being inexpensive, operable under adverse weather conditions, a unit that may be fabricated from easily obtained materials and with conventional tools and equipment, and which may be assembled and disassembled in the field and electrically connected to conventional house current or storage battery circuits without the requirement of special tools and technical skills.

In the accompanying drawings, the single figure is an elevational view, partly in section, illustrating the novel light projector with its various components in assembled operating relationship.

The novel projector comprises a cast base member 1 defining upper and lower cylindrical chambers 2 and 3, respectively. The lower chamber is adapted to receive an elevating support member, or column 4 having its lower end portion 5 tapered for ease in driving the column into the ground, as will hereinafter be described. An annular groove 6 is provided to weaken the column sufficiently to lower its resistance to forces imposed laterally thereof. A frangible portion is thereby established in case the projector should be collided with by moving planes or service vehicles.

The upper end of the column 4 is preferably slightly tapered for secure engagement with the wall surface of the chamber 3 of the support member 1. The upper portion of the base member 1 is preferably provided with an annular radially extending flanged portion 7, which acts as a convenient mounting base, as will hereinafter be described. The marginal surface portion 8 of the flanged portion 7 is preferably tapered to receive an apron 9 having a resilient mounting gasket 10 interposed therebetween. The apron is preferably conical in contour, but may be of any desired form to provide sufficient marking characteristics. The gasket 10 also acts as a watertight seal for the cup-like lens 11, which is also seated on the flange portion 7 of the supporting member 1. The cup-like lens shown is preferably of the well-known fresnel type commonly used in airfield lighting. It is preferred to have the prisms of the lens refract projected light at an angle disposed vertically relative to an airfield and at an established degree for general landing elevations.

The upper chamber 2 of the supporting member 1 is adapted to receive a socket or lamp receptacle 15, which may be held in place by means of a recessed screw 16 entering through an opening communicating with the lower chamber 3. The receptacle 15 is arranged to receive a conventional projector lamp 17 seated therein. The lamp may be of the threaded base type or of a bayonet base variety. Conducting leads 18 terminate at the receptacle 15 and may enter through an opening 19 in the side of the supporting member 1.

A novel latching means is provided for securing the apron 9 to the marginal portion 8 of the base member 1. The latch comprises a plurality of keys, slidably and rotatively received by openings 26 in the marginal portion 8. The keys are retained in each opening by means of a coil spring 27 having one end abutting a washer 28 and the other end resting against the inner surface of the flange 7. During assembly, the keys 25 are inserted in their respective opening, and through the spring. The washer 28 is placed thereon, and the extremities 29 of the keys 25 are bent outwardly to lock the spring in place. It will be apparent that each latch key 25 is urged by the spring 27 towards entrance into its opening 26.

Elongated slotted openings 30 are provided in the apron 9 to receive the head portions of the latch keys 25 when rotated to unlatch position. The conical aprons are preferably embossed transversely of the openings 30 to provide a stop 31 for the key when in latched position, as shown in the full portion of the single figure. The key is placed in latched position after insertion through the slotted openings 30 by rotating it substantially 90° of the slot and resting against the stop 31.

The convenient portable feature of the structure will be apparent from the above description. The structure may be completely broken down in transit and may be completely assembled in the field by unskilled operators with conventional tools. An installation of the plurality of projectors mounted parallel to a landing strip in spaced relationship with one another is accomplished by laying a waterproof cable substantially parallel to the runway and connected to a bank of storage batteries or to a source of conventional household current.

The stakes, or columns 4, of each of the projectors are then driven into the ground at the desired locations, and the supporting member 1 is fitted to the upper portion of the column 4. A projector lamp 17 is positioned in the receptacle 15. The resilient gasket 10 is placed over the lower flanged portion of the lens 11 and the lens is placed on the upper surface of the flanged portion 8 of the base member 7. Next the keys 25 are oriented to receive the apron 8 through the slots 30 therein. After the conical apron is slipped over the keys and placed in proper position, each of the keys is rotated to latch position, and the unit is ready for the connection to line.

The leads 18 may now be connected to line cables (not shown). The cable may be laid in furrows along the runway or on top of the ground for very temporary operations. It is preferred to splice the ends of the leads 18 to the cable, but it is within the scope of this invention to provide needle clips (not shown) for clamping through the cable insulation for convenient electrical connection.

It will be apparent that there has been provided by the present invention an inexpensive landing strip light projector, which may be conveniently used by private plane operators having access to airfields for landing and take-off operations, and which projector provides excellent safety factor to such operations at a relatively little expense. It will also be apparent that the projector is completely portable and may be removed from one installation to another without the requirement of special tools or skilled operators, and which may be powered from storage battery or conventional household electrical circuits.

I claim:

1. In a light projector including a lens, a base member having an annular bearing surface extending radially thereof, and having an angularly disposed marginal portion, and a conical apron surrounding said base member and being freely suspended radially relative thereto and arranged for mounting on said base member at said marginal portion, said marginal portions and said apron each defining openings in register with one another respectively; latching means comprising rotatable and slidable headed key members extending through said registerable openings in said marginal portion and said conical apron, the registerable openings of said apron being elongated to receive the headed portions of said key members in unlatch position, said key members being rotatable to latch position transversely of the direction of elongation of said openings, and biasing means for retaining said key members in latch position.

2. A light projector comprising a base member having a bearing surface extending laterally thereof, said bearing surface having a plurality of circumferentially spaced openings therein, a projector lamp receptacle for said base member, removable latch members received by said spaced openings in said bearing surface, an apron surrounding said base member and being freely suspended radially relative thereto defining latch-receiving means engaging said latch members, a projector lens having an opening engaging said bearing surface and a resilient sealing gasket member interposed between said conical apron and said lens.

3. A light projector comprising an elevating support member, a base member removably supported by said supporting member and having a bearing surface extending laterally thereof, said bearing surface having a plurality of circumferentially spaced openings therein, a projector lamp receptacle for said base member, headed latch members rotatably and slidably received by said spaced openings in said bearing surface, an apron surrounding said support member and being freely suspended radially relative thereto and defining a plurality of slotted openings receiving the heads of said latch members, said latch members being rotatable to latch position substantially transversely of said slotted openings, biasing means urging said latch members towards latching position, and a projector lens having an opening engaging said bearing surface.

4. A light projector comprising a supporting column having a frangible portion intermediate its ends, a base member removably supported by said supporting member and having an annular bearing surface extending radially thereof, said bearing surface having a plurality of circumferentially spaced openings therein, a projector lamp receptacle for said base member, headed latch members rotatably and slidably received by said spaced openings in said bearing surface, spring members for each of said latch members urging said members towards entrance to said openings, an apron surrounding said support member and being freely suspended radially relative thereto and defining a plurality of slotted openings receiving the heads of said latch members in unlatched position, said headed latch members being rotatable to latch position substantially transversely of said slotted openings, and a cup-like lens having an opening engaging said bearing surface.

5. A light projector comprising an elevating support member having a frangible portion intermediate its ends, a base member removably supported by said supporting member and having an annular bearing surface extending radially thereof, said bearing surface having a plurality of circumferentially spaced openings therein, a projector lamp receptacle for said base member, headed latch members rotatably and slidably received by said spaced openings in said bearing surface, spring members for each of said latch members urging said members towards entrance to said openings, a conical apron surrounding said support member and being freely suspended radially relative thereto and defining a plurality of slotted openings receiving the heads of said latch members in unlatched position, said headed latch members being rotatable to latch position substantially transversely of said slotted openings, a cup-like lens having an opening engaging said bearing surface, and a resilient sealing gasket member interposed between said conical apron and said lens.

6. A light projector comprising an elevating support member having a frangible portion intermediate its ends, a base member removably supported by said supporting member and including an annular bearing surface extending radially thereof and having an angularly disposed marginal portion, said angularly disposed marginal portion having a plurality of circumferentially spaced openings therein, a projector lamp receptacle for said base member, headed latch members rotatably and slidably received by said spaced openings in said marginal portion, spring members for each of said latch members urging said members towards entrance to said openings, a conical apron surrounding said support member and being freely suspended radially relative thereto and adapted to register with said angularly disposed marginal portion and defining a plurality of slotted openings receiving the heads of said latch members in unlatched position, said headed latch members being rotatable to latch position substantially transversely of said slotted openings, a fresnel lens having an opening engaging said bearing surface, and a resilient sealing gasket member interposed between said conical apron and said lens.

References Cited in the file of this patent

UNITED STATES PATENTS

| 1,394,667 | Corbin | Oct. 25, 1921 |
| 2,332,362 | Bartow | Oct. 9, 1943 |
| 2,463,057 | Runge | Mar. 1, 1949 |
| 2,597,739 | Lacy et al. | May 20, 1952 |

FOREIGN PATENTS

| 497,163 | Great Britain | Dec. 14, 1938 |